(12) United States Patent
Honda

(10) Patent No.: US 12,022,220 B2
(45) Date of Patent: Jun. 25, 2024

(54) IMAGING SENSOR HAVING AVALANCHE DIODE AND CONTROL METHOD OF IMAGING SENSOR

(71) Applicant: CANON KABUSHIKI KAISHA, Tokyo (JP)

(72) Inventor: Koki Honda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 18/059,275

(22) Filed: Nov. 28, 2022

(65) Prior Publication Data

US 2023/0171521 A1 Jun. 1, 2023

(30) Foreign Application Priority Data

Dec. 1, 2021 (JP) ................................. 2021-195361

(51) Int. Cl.
*H04N 25/768* (2023.01)
*H04N 25/13* (2023.01)

(52) U.S. Cl.
CPC ......... *H04N 25/768* (2023.01); *H04N 25/134* (2023.01)

(58) Field of Classification Search
CPC ........................... H04N 25/768; H04N 25/134
USPC ...................................................... 348/207.99
See application file for complete search history.

(56) References Cited

U.S. PATENT DOCUMENTS 9,210,350 B2 12/2015 Dai et al.
2015/0163429 A1* 6/2015 Dai ...................... H04N 25/581
348/295

* cited by examiner

*Primary Examiner* — Joel W Fosselman
(74) *Attorney, Agent, or Firm* — CANON U.S.A., INC. IP Division

(57) ABSTRACT

Among a plurality of time measurement circuits configured to measure a time until a pixel counter saturates in the imaging sensor having the signal multiplication pixel structure, at least one time measurement circuit functions as a time counter that obtains a time from the pixel counter starting count of pulses until saturation and the other time measurement circuits function as a difference counter that obtains a difference between a time until a certain pixel counter saturates and a time until another pixel counter different from the certain pixel counter saturates. Then, a time from the pixel counter associated with the time measurement circuit that functions as a difference counter starting count of the pulses until saturation is found by calculation processing.

12 Claims, 15 Drawing Sheets

IMAGING SENSOR HAVING AVALANCHE DIODE AND CONTROL METHOD OF IMAGING SENSOR

BACKGROUND

Field

The present disclosure relates to an imaging sensor having a signal multiplication pixel structure.

Description of the Related Art

A photoelectric conversion element is known that digitally counts the number of photons incident on an avalanche photodiode and outputs the counted value from a pixel as a photoelectrically converted digital signal. From the point of view of improvement of noise resistance and convenience of signal calculation processing, the advantage of digitizing a pixel signal is great and an imaging sensor in which a plurality of pixels outputting a photoelectrically converted digital signal is arranged and an imaging device mounting the imaging sensor begin to spread. For the imaging sensor such as this, there is known a method of finding the number of photons per frame, in a case where the number of counted photons reaches a threshold value in a time shorter than the time corresponding to one frame, by measuring the time and from information on a time until the threshold value is reached and the threshold value. Then, U.S. Pat. No. 9,210,350 has disclosed a technique to accurately find the number of photons by providing an exposure time counter for each pixel and measuring the unique exposure time for each pixel.

In order to more accurately find the number of photons with the technique described in U.S. Pat. No. 9,210,350, it is necessary to improve resolution of the exposure time counter. However, the exposure time counter with high time resolution consumes much power, and therefore, it is not practical to provide the exposure time counter with high time resolution for each pixel for the purpose of improving accuracy.

SUMMARY

The imaging sensor according to the present disclosure includes a plurality of pixels, a plurality of signal processing circuits, a plurality of time measurement circuits, a time derivation circuit, and a storage circuit. The plurality of pixels includes an avalanche photodiode that detects incidence of a photon. The plurality of signal processing circuits has a pulse generation circuit configured to generate a pulse based on photon detection in the avalanche photodiode and a pixel counter that counts pulses output from the pulse generation circuit. The plurality of time measurement circuits is configured to measure a time until the pixel counter saturates. At least one time measurement circuit functions as a time counter that obtains a time from the pixel counter starting count of the pulses until saturation and the other time measurement circuits function as a difference counter that obtains a difference between a time until a certain pixel counter saturates and a time until another pixel counter different from the certain pixel counter saturates. The time derivation circuit is configured to derive a time from the pixel counter associated with the time measurement circuit that functions as the difference counter starting count of the pulses until saturation. The storage circuit is configured to store a time value indicating a time derived by the time derivation circuit for next derivation. The time derivation circuit performs the derivation by adding a difference obtained by the time measurement circuit that functions as the difference counter to the time value stored in the storage circuit or subtracting the difference from the time value.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

First Embodiment

<Configuration of Photon Measurement Device>

Figure 1:
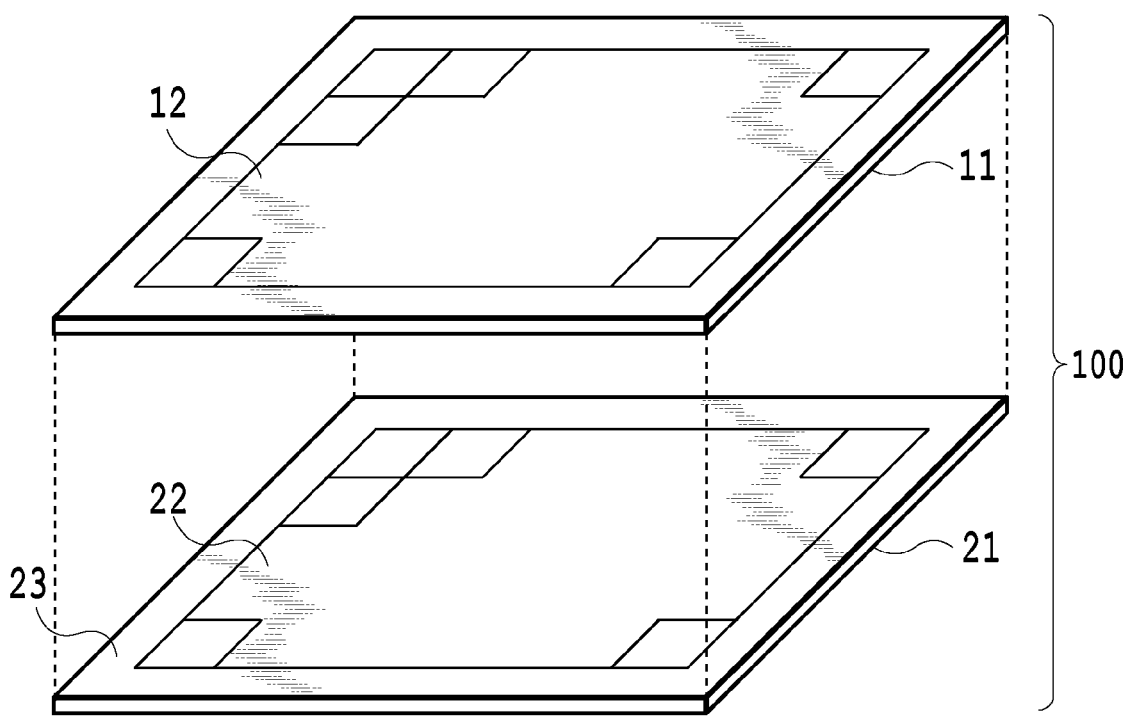
FIG. 1 is a diagram showing a configuration example of an imaging sensor.

FIG. 1 is a diagram showing a configuration example of an imaging sensor according to the present embodiment. An imaging sensor 100 is configured by two chips, that is, a sensor chip 11 and a circuit chip 21 being laminated and connected electrically. The sensor chip 11 includes a pixel area 12. The circuit chip 21 includes a pixel circuit area 22 that processes a digital signal corresponding to the photon detected in each pixel within the pixel area 12 and a reading circuit area 23 for reading out a signal from the pixel circuit area 22.

<Configuration of Sensor Chip>

Figure 2:
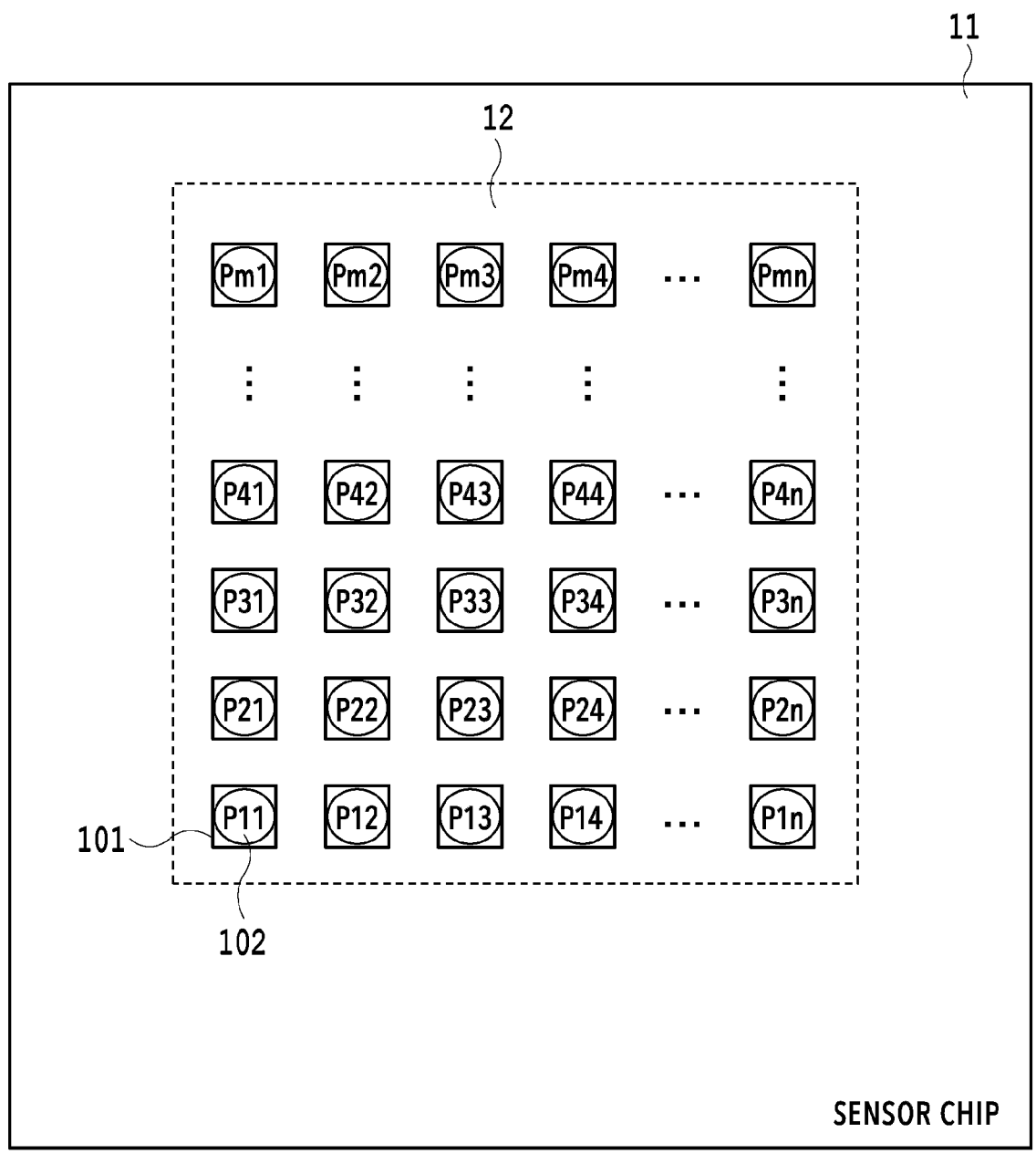
FIG. 2 is a diagram showing a configuration example of a sensor chip.

FIG. 2 is a diagram showing a configuration example of the sensor chip 11 according to the present embodiment. The pixel area 12 of the sensor chip 11 includes a plurality of pixels 101 arranged in the form of a two-dimensional array across in the directions of a plurality of rows and a plurality of columns. The pixel 101 comprises a photoelectric conversion unit or circuit 102 including an avalanche photodiode (in the following, APD). In FIG. 2, part of the m×n pixels 101 arranged in m rows from the first row up to the mth row from bottom toward top and in n columns from the first column up to the nth column from left toward right are shown along with symbols indicating the row number and the column number. For example, to the pixel 101 arranged in the first row and in the third column, symbol "P13" is appended. The number of rows and the number of columns of the pixel array constituting the pixel area 12 are not limit particularly and as each of the number of rows and the number of columns, a value, such as several hundred to several thousand, is supposed.

<Configuration of Circuit Chip>

Figure 3:
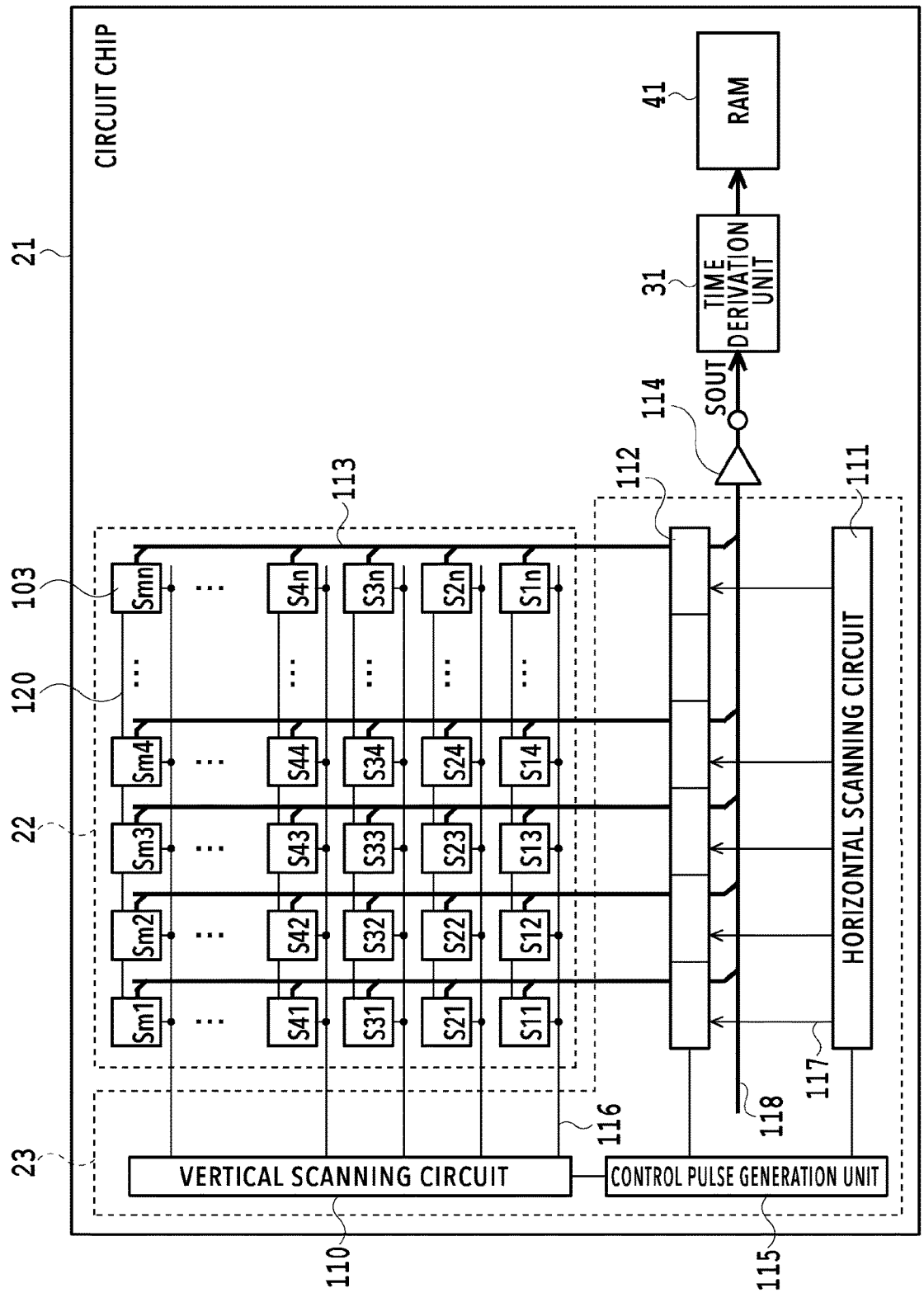
FIG. 3 is a diagram showing an internal configuration of a circuit chip according to a first embodiment.

FIG. 3 is a diagram showing the internal configuration of the circuit chip 21 according to the present embodiment. Within the circuit chip 21, the pixel circuit area 22 and the reading circuit area 23 are provided and further, a time derivation unit or circuit 31 and a RAM 41 exist.

The pixel circuit area 22 includes a plurality of signal processing units or circuits 103 arranged in the form of a two-dimensional array across in the directions of a plurality of rows and a plurality of columns. In FIG. 3, part of the m×n signal processing circuits 103 arranged in m rows from the first row up to the mth row from bottom toward top and in n columns from the first column up to the nth column from left toward right are shown along with symbols indicating the row number and the column number. For example, to the signal processing circuit 103 arranged in the first row and in the third column, symbol "P13" is appended. The number of rows and the number of columns of the signal processing circuit array constituting the pixel circuit area 22 are usually equal to the number of rows and the number columns of the pixel array constituting the pixel area 12.

The reading circuit area 23 includes a vertical scanning circuit 110, a horizontal scanning circuit 111, a column circuit 112, an output circuit 114, and a control pulse generation unit or circuit 115.

In each row of the signal processing circuit array of the pixel circuit area 22, a control line 116 is arranged, extending in a first direction (in the transverse direction in FIG. 3). The control line 116 is connected to each signal processing circuit 103 arranged in the first direction. The first direction in which the control line 116 extends is sometimes described as the row direction or the horizontal direction.

The control line 116 in each row is connected to the vertical scanning circuit 110. The vertical scanning circuit 110 supplies a control signal for driving the signal processing circuit 103 to the signal processing circuit 103 via the control line 116.

In each column of the signal processing circuit array of the pixel circuit area 22, a signal line 113 is arranged, extending in a second direction (in the longitudinal direction in FIG. 3) intersecting the first direction. The signal line 113 is connected to each signal processing circuit 103 arranged in the second direction. The second direction in which the signal line 113 extends is sometimes described as the column direction or the vertical direction. Each signal line 113 comprises n signal lines for outputting an n-bit digital signal.

The signal line 113 in each column is connected to the column circuit 112. Each column circuit 112 is provided so as to correspond to each column of the signal processing circuit array of the pixel circuit area 22 and connected to the signal line 113 in the corresponding column. The column circuit 112 has a function to store a signal read out from the signal processing circuit 103 via the signal line 113 in the corresponding column.

The horizontal scanning circuit 111 supplies a control signal for reading out a signal from the column circuit 112 to the column circuit 112. The horizontal scanning circuit 111 supplies a control signal to the column circuit 112 of each column via a control line 117. The column circuit 112 having received a control signal from the horizontal scanning circuit 111 outputs the signal stored by the column circuit 112 itself to the output circuit 114 via a horizontal output line 118. The horizontal output line 118 comprises n signal lines for outputting an n-bit digital signal.

The output circuit 114 outputs a signal corresponding to a pixel signal to the time derivation circuit 31 as an output signal SOUT.

The control pulse generation circuit 115 supplies control signals that control the operation and its timing of the vertical scanning circuit 110, the horizontal scanning circuit 111, and the column circuit 112. It may also be possible to supply at least part of the control signals that control the operation and its timing of the vertical scanning circuit 110, the horizontal scanning circuit 111, and the column circuit 112 from the outside of the imaging sensor 100.

A control line 120 of each row supplies a control signal from the signal processing circuit 103 to another signal processing circuit 103. The connection of the control line 120 is not limited to the row direction.

The time derivation circuit 31 calculates a time (saturation time) from the start of count in a pixel counter 221, to be described later, until the count value reaches a predetermined threshold value.

The RAM 41 temporarily stores the output of the time derivation circuit 31.

The time derivation circuit 31 and the RAM 41 may not be mounted on the circuit chip 21 and may be an external component of the imaging sensor 100.

<Details of Pixel and Signal Processing Circuit>

Figure 4:
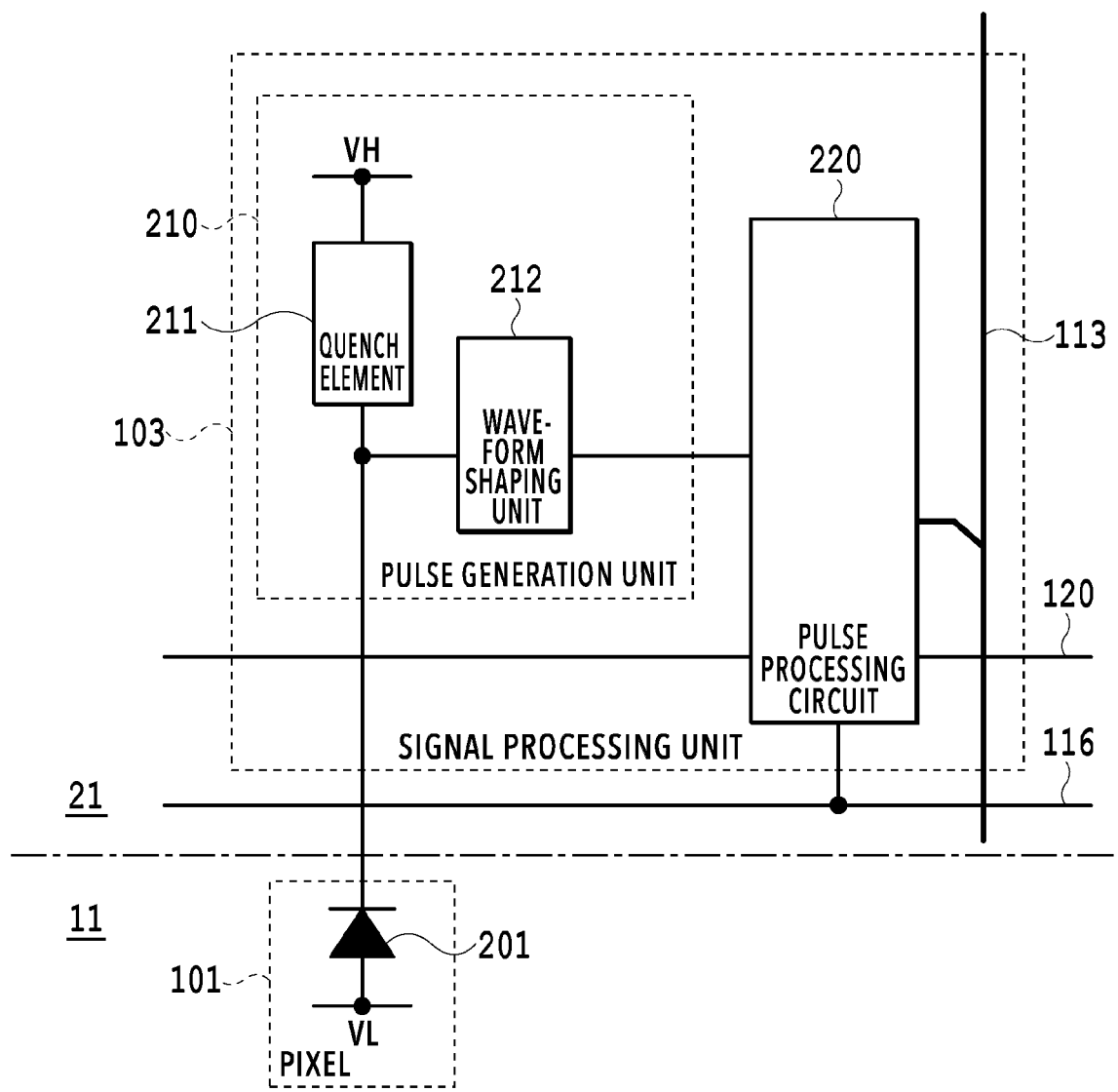
FIG. 4 is a diagram showing an equivalent circuit of a pixel in a sensor chip and an internal configuration of a signal processing unit or circuit in a circuit chip.

FIG. 4 is a diagram showing an equivalent circuit of the pixel 101 in the sensor chip 11 and the internal configuration of the signal processing circuit 103 in the circuit chip 21.

The pixel 101 has an APD 201 as a photoelectric conversion unit or circuit and in a case where light enters the APD 201, a charge pair in accordance with the incident light is generated by photoelectric conversion. To the anode of the APD 201, a voltage VL (first voltage) is supplied. Further, to the cathode of the APD 201, a voltage VH (second voltage) higher than the voltage VL supplied to the anode is supplied. For example, the voltage VL (first voltage) is −30 V and the voltage VH (second voltage) is 1 V. To the anode and cathode, a reverse bias voltage that causes the APD 201 to perform the avalanche multiplication operation is supplied. By bringing about the state where the voltages such as those are supplied, charges generated by the incident light cause avalanche multiplication and an avalanche current occurs. The APD has two kinds of mode, that is, a Geiger mode in which the APD is caused to operate with a potential difference between anode and cathode in a case where the reverse bias voltage is supplied, which is larger than the yield voltage, and a linear mode in which the APD is caused to operate with a potential difference in the vicinity of the yield voltage or less. Then, the APD that is caused to operate in the Geiger mode is called SPAD (Single Photon Avalanche Diode).

The signal processing circuit 103 includes a pulse generation unit or circuit 210 and a pulse processing unit or circuit 220. The pulse generation circuit 210 includes a quench element 211 and a waveform shaping unit or circuit 212. The quench element 211 is connected to a power source that supplies the voltage VH and the APD 201. The quench element 211 has a function to replace a change in the avalanche current that occurs in the APD 201 with a voltage signal. The quench element 211 functions as a load circuit (quench circuit) at the time of signal multiplication by avalanche multiplication and has a function to suppress the avalanche multiplication by suppressing the voltage that is supplied to the APD 201 (quench operation). The waveform shaping circuit 212 shapes the change in potential at the cathode of the APD 201, which is obtained at the time of photon detection, and outputs a pulse signal. As the waveform shaping circuit 212, for example, an inverter circuit or a buffer circuit is used. Upon receipt of a photon detection pulse generated in the pulse generation circuit 210, the pulse processing circuit 220 counts the number of photon detection pulses, and measures the exposure time from the start of exposure until the counter reaches a predetermined value.

<Details of Pulse Processing Circuit>

Figure 5:
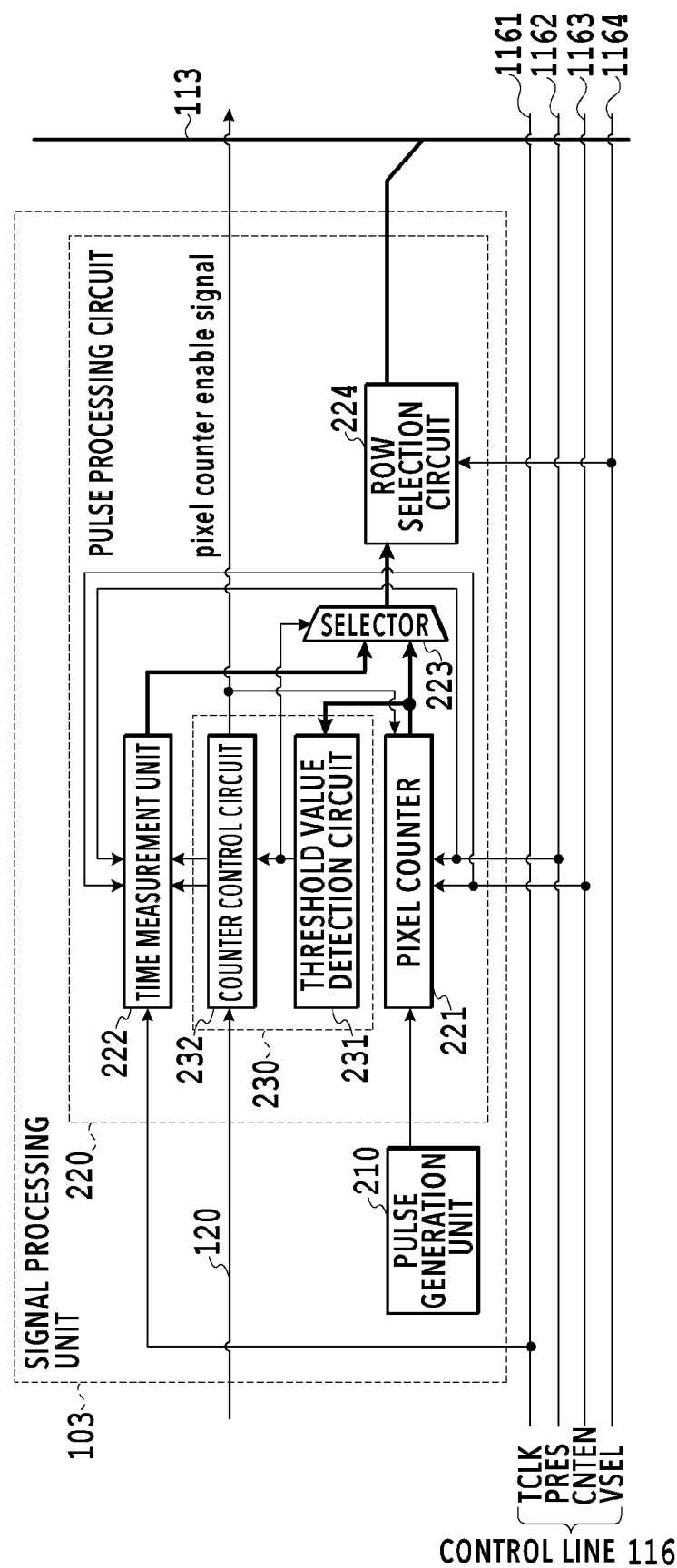
FIG. 5 is a diagram showing an internal configuration of a pulse processing circuit according to the first embodiment.

FIG. 5 is a diagram showing the internal configuration of the pulse processing circuit 220 according to the present embodiment. The pulse processing circuit 220 includes the pixel counter 221, a time measurement unit or circuit 222, a selector 223, a row selection circuit 224, and a time measurement control unit or circuit 230. The time measurement control circuit 230 includes a threshold value detection circuit 231 and a counter control circuit 232.

The pixel counter 221 counts pulse signals output from the pulse generation circuit 210 during the period of time of one frame based on a control signal CNTEN that controls the exposure time. The control signal CNTEN is supplied from the control pulse generation circuit 115 via the vertical scanning circuit 110 and a control line 1163 and the pixel counter 221 starts count at the rise of the control signal CNTEN and ends the count at the fall of the control signal CNTEN. Further, the pixel counter 221 resets the count value based on a control signal PRES. The control signal PRES is supplied from the control pulse generation circuit 115 via the vertical scanning circuit 110 and a control line 1162. In the present embodiment, it is assumed that the pixel counter 221 is an 8-bit counter capable of counting 0 to 255.

The threshold value detection circuit 231 detects that the count value of the pixel counter 221 has reached a predetermined threshold value and notifies the counter control circuit 232 and the selector 223 of that. In the present embodiment, the predetermined threshold value is taken to be the maximum value (saturated value in a case where all bits are 1, that is, 255) that the 8-bit counter can count, but another value (for example, an intermediate value, such as 127 and 63) may be accepted.

The time measurement circuit 222 is either a time counter or a difference counter. In the present embodiment, part of a plurality of the time measurement circuits 222 included in the signal processing circuit array function as a time counter and the rest function as a difference counter. In the present embodiment, for simplicity of explanation, it is assumed that the time measurement circuits 222 of the signal processing circuits 103 in the first column (Sm 1) among the m-row× n-column signal processing circuit array are configured to function as a time counter. Then, it is assumed that the time measurement circuits 222 of the signal processing circuits 103 in the other columns (Sm2, Sm3, . . . , Smn) are configured to function as a difference counter.

The time measurement circuit 222 as a time counter measures the time from the start of exposure until the end of exposure in one frame. Specifically, the time measurement circuit 222 obtains the time value indicating the exposure time by starting count at the rise of the control signal CNTEN and ending the count at the fall thereof. Then, in a case of being notified by the threshold value detection circuit 231 that the pixel counter 221 has saturated within the period of time of one frame, the time measurement circuit 222 stops the time count at that point of time. In a case where there is no notification indicating that the pixel counter 221 has saturated within the period of time of one frame, the time measurement circuit 222 as a time counter continues to perform the time count until the fall of the control signal CNTEN.

The time measurement circuit 222 as a difference counter starts time count by taking the notification of the start of count from the counter control circuit 232 as a starting point. The notification timing of the start of time count is that at which one of the pixel counter 221 associated with itself and another pixel counter 221 for which to take a difference reaches saturation within the period of time of one frame. Here, for example, it is assumed that the pixel counter 221 associated with itself is the pixel counter 221 within the signal processing circuit 103 in "S12". At this time, another pixel counter 221 for which to take a difference is the pixel counter 221 within the signal processing circuit 103 in "S11" arranged one before in the row direction. In a case where there is a notification of count stop from the counter control circuit 232 after the time count is started, the difference counter stops the time count. The notification timing of count stop is that at which both the pixel counter 221 associated with itself and another pixel counter 221 for which to take a difference saturate within the period of time of one frame.

Both in a case of functioning as a time counter and in a case of functioning as a difference counter, the time measurement circuit 222 resets the count value in response to the control signal PRES that is supplied from the control pulse generation circuit 115 via the vertical scanning circuit 110 and the control line 1162. The time measurement circuit 222 is, for example, a 14-bit counter, and counts clock edges of a time clock (TCLK) 1161. In the output of the time measurement circuit 222, a 1-bit code bit is included. At the time of the time measurement circuit 222 functioning as a difference counter, for example, in a case where the pixel counter 221 associated with itself saturates earlier than another pixel counter 221 for which to take a difference, positive is recorded and in the other cases, negative is recorded. That is, the time measurement circuit 222 is given two signals, that is, a signal that controls the count period of time and a signal indicating the sign of a difference, by the counter control circuit 232.

Upon receipt of the notification that the count value of the pixel counter 221 has reached the predetermined threshold value from the threshold value detection circuit 231, the counter control circuit 232 causes the pixel counter 221 to stop the pulse count by setting a pixel counter enable signal to "Low". Further, this pixel counter enable signal is also sent to another signal processing circuit 103 via the control line 120. Furthermore, the counter control circuit 232 determines whether a difference has occurred by receiving the saturation situation of another pixel counter 221 for which to take a difference from the control line 120 and notifies the time measurement circuit 222 to start and stop the time count. The circuit that determines whether a difference has occurred is, for example, an XOR (exclusive OR) of the signals that are obtained from the control line 120 and the threshold value detection circuit 231. In a case where the time measurement circuit 222 functions as a time counter, for example, it is possible to make the time counter and the difference counter the same circuit by regarding the control line 120 as corresponding to saturation at all times.

The selector 223 selects the output of the time measurement circuit 222 in a case where there is a notification that the pixel counter 221 has reached the saturated value during the period of time of one frame from the threshold value detection circuit 231, or selects the output of the pixel counter 221 in a case where there is no such notification and supplies the output to the row selection circuit 224. In the present embodiment, in the output of the time measurement circuit 222, the time count value, the code bit, and a flag (in the following, described as "difference flag") indicating whether the time measurement circuit 222 functions as a time counter or a difference counter are included. The output of the pixel counter 221 is the count value of the pulses output by the pulse generation circuit 210.

The row selection circuit 224 switches between electrical connection and nonconnection of the selector 223 and the control line 113 by a control signal VSEL that is supplied from the control pulse generation circuit 115 via the vertical scanning circuit 110 and a control line 1164. The row selection circuit 224 includes, for example, a buffer circuit for outputting a signal, and the like.

<Output Format of Counter>

Figure 6A:
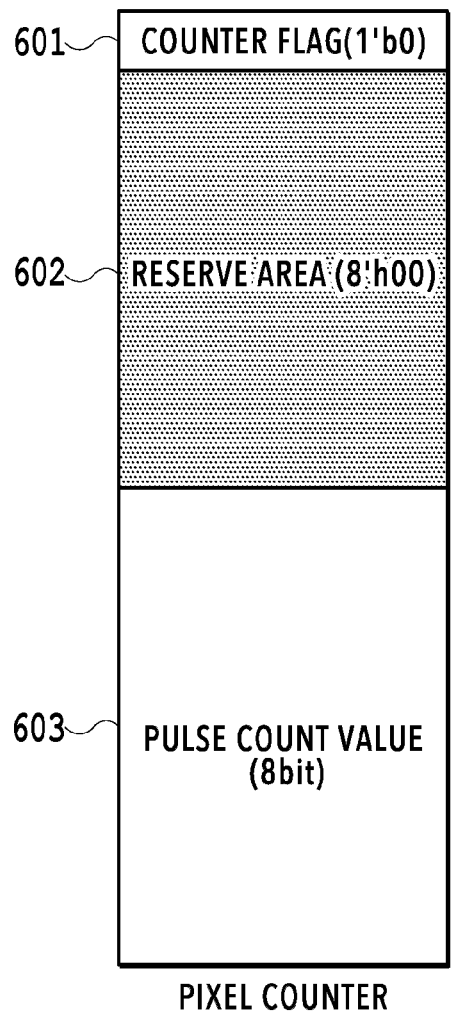
FIG. 6A is a diagram showing an output format of a pixel counter and FIG. 6B is a diagram showing an output format of a time measurement unit or circuit.
Figure 6B:
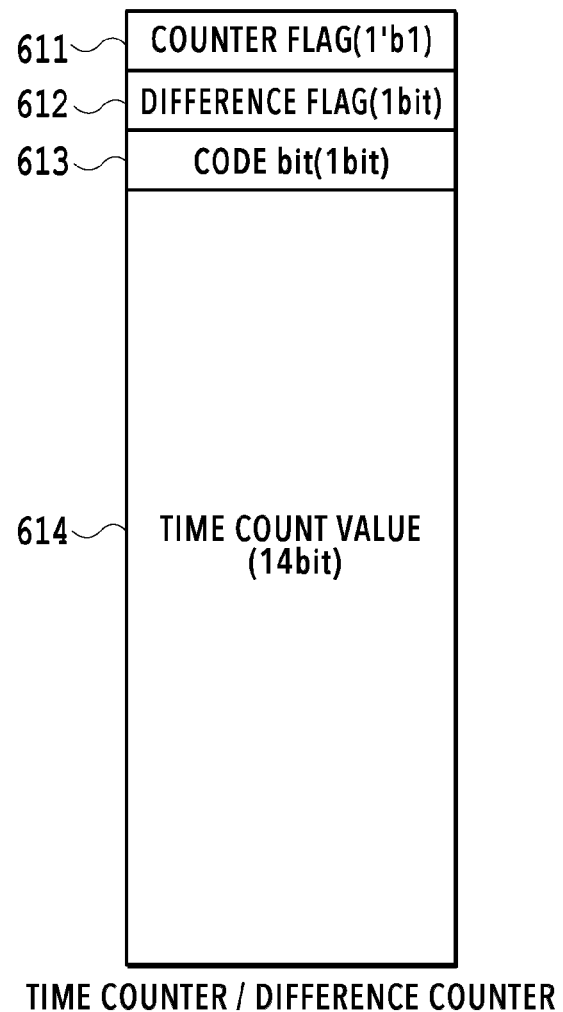

FIG. 6A is a diagram showing an output format of the pixel counter 221 according to the present embodiment and FIG. 6B is a diagram showing an output format of the time measurement circuit 222 as a time counter or a difference counter.

<Output Format of Pixel Counter>

To the most significant bit of the output format of the pixel counter 221, a counter flag 601 is allocated, which indicates whether the output data is the output of the pixel counter 221 or the output of the time measurement circuit 222 (time counter or difference counter). In the present embodiment, a flag value of "0" indicates the pixel counter 221 and a flag value of "1" indicates the time measurement circuit 222. Consequently, in the output format in FIG. 6A, "0" is stored in the counter flag 601.

A shaded area 602 that follows the counter flag 601 is an 8-bit reserve area for adjusting the output bus width of the pixel counter 221 and the time measurement circuit 222 to 17 bits. In this reserve area 602, "0" is stored.

Then, a low-order 8-bit area 603 is an area that stores a pulse count value.

The selector 223 that selects the output of the pixel counter 221 adds the counter flag 601 and the reserve area 602, both having a fixed value, and outputs data in accordance with the output format shown in FIG. 6A.

<<Output Format of Time Counter/Difference Counter>>

To the most significant bit of the output format of the time measurement circuit 222 that functions as s time counter or a difference counter, a counter flag 611 the same kind as the counter flag 601 described previously is allocated. That is, the flag indicating whether the output data is the output of the pixel counter 221 or the output as a time counter or a difference counter is allocated. In the present embodiment, a flag value of "0" indicates the pixel counter 221 and a flag value of "1" indicates the time measurement circuit 222, and therefore, in the output format in FIG. 6B, "1" is stored in the counter flag 611.

To the next bit that follows the counter flag 611, a difference flag 612 is allocated, the difference flag being described previously. In the present embodiment, a flag value of "0" indicates a time counter and a flag value of "1" indicates a difference counter and in the difference flag 612, one of the values is stored.

To the next bit that follows the difference flag 612, a code bit 613 is allocated, which indicates positive/negative of the time count value of the output data in a case where the flag value of the difference flag 612 is "1". In the present embodiment, a flag value of "0" indicates negative and a flag value of "1" indicates positive and in the code bit 613, one of the values is stored. In a case where the flag value of the difference flag 612 is "0", either value may be stored.

Then, a low-order 14-bit area 614 is an area storing a time count value.

The selector 223 that selects the output of a time counter or a difference counter outputs data in accordance with the output format shown in FIG. 6B. Specifically, to the 14-bit time count value, flag values are added as follows. First, the fixed-value counter flag 611 is added. Then, in a case where the time measurement circuit 222 is operating as a time counter, the flag value "0" is added to the difference flag 612 and in a case of operating as a difference counter, the flag value "1" is added to the difference flag 612. Further, in a case where the time measurement circuit 222 is operating as a difference counter, upon receipt of the notification that the difference is negative, "0" is added as the flag value of the code bit 613 and upon receipt of the notification that the difference is positive, "1" is added as the flag value thereof.

In the present embodiment, the configuration is such that information indicating whether each time measurement circuit 222 functions as a time counter or a difference counter is stored in advance in a buffer and the like and the information is output, but the configuration is not limited to this. For example, it may also be possible to perform management in the reading circuit area 23 in FIG. 3 or in processing or subsequent processing in the post stages, not shown schematically. In a case where such a configuration is adopted, the difference flag 612 within the output format shown in FIG. 6B is no longer necessary.

Figure 7:
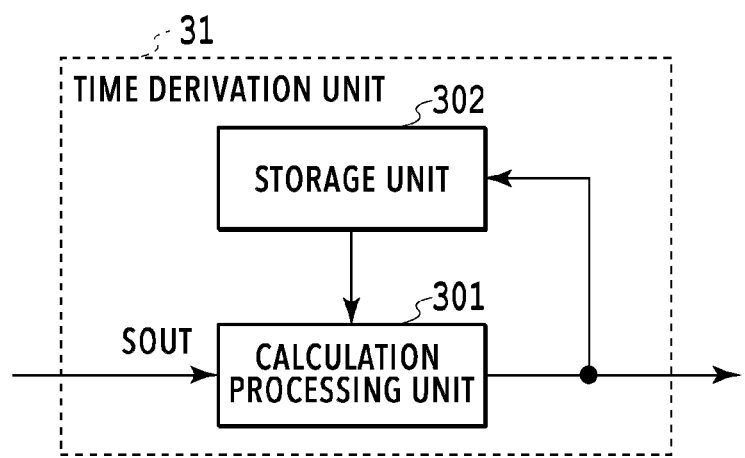
FIG. 7 is a diagram showing an internal configuration of a time derivation unit or circuit.

FIG. 7 is a diagram showing the internal configuration of the time derivation circuit 31 according to the present embodiment. The time derivation circuit 31 includes a calculation processing circuit 301 and a storage circuit 302.

The calculation processing circuit 301 calculates the actual saturation time in each pixel counter by finding the accumulated sum of the time count value of the time counter and the time count value of the difference counter, which are used as a reference of the saturation time count. Specifically, the sum of the time value stored in the storage circuit 302, to be described later, and the difference obtained from the output SOUT of the circuit chip 21 is found by calculation. This calculation processing is performed in a case where the flag value of the counter flag 611 (see FIG. 6B described previously) included in the output SOUT is "1" indicating a time counter or a difference counter and the flag value of the difference flag 612 is "1" indicating a difference counter. The time value indicating the calculated saturation time is output to the RAM 41 and the storage circuit 302 along with the counter flag 611. In a case where the flag value of the counter flag 611 included in the output SOUT is a value other than the value described above, calculation is not necessary, and therefore, data from which data corresponding to the difference flag 612 and the code bit 613 is removed from the output SOUT is output.

The storage circuit 302 is, for example, a storage device including a register and for storing the time value calculated in the calculation processing circuit 301. However, in a case where the flag value of the counter flag 611 included in the output SOUT of the circuit chip 21 is "0" indicating the pixel counter 221, it is meant that the pixel counter 221 has not saturated during the period of time of one frame. Consequently, in this case, the time value currently stored is overwritten by the maximum value of the time count value 614 that can be counted during the period of time of one frame. The output of the storage circuit 302 is input to the calculation processing circuit 301 and used for the next calculation of the saturation time.

It may also be possible to provide the function of the time derivation circuit 31 described above, for example, inside the column circuit 112. In this case, the configuration is such that the time value indicating the actual saturation time found within the column circuit 112 is output directly from the output circuit 114 to the RAM 41.

<Operation of Pulse Processing Circuit>

Figure 8:
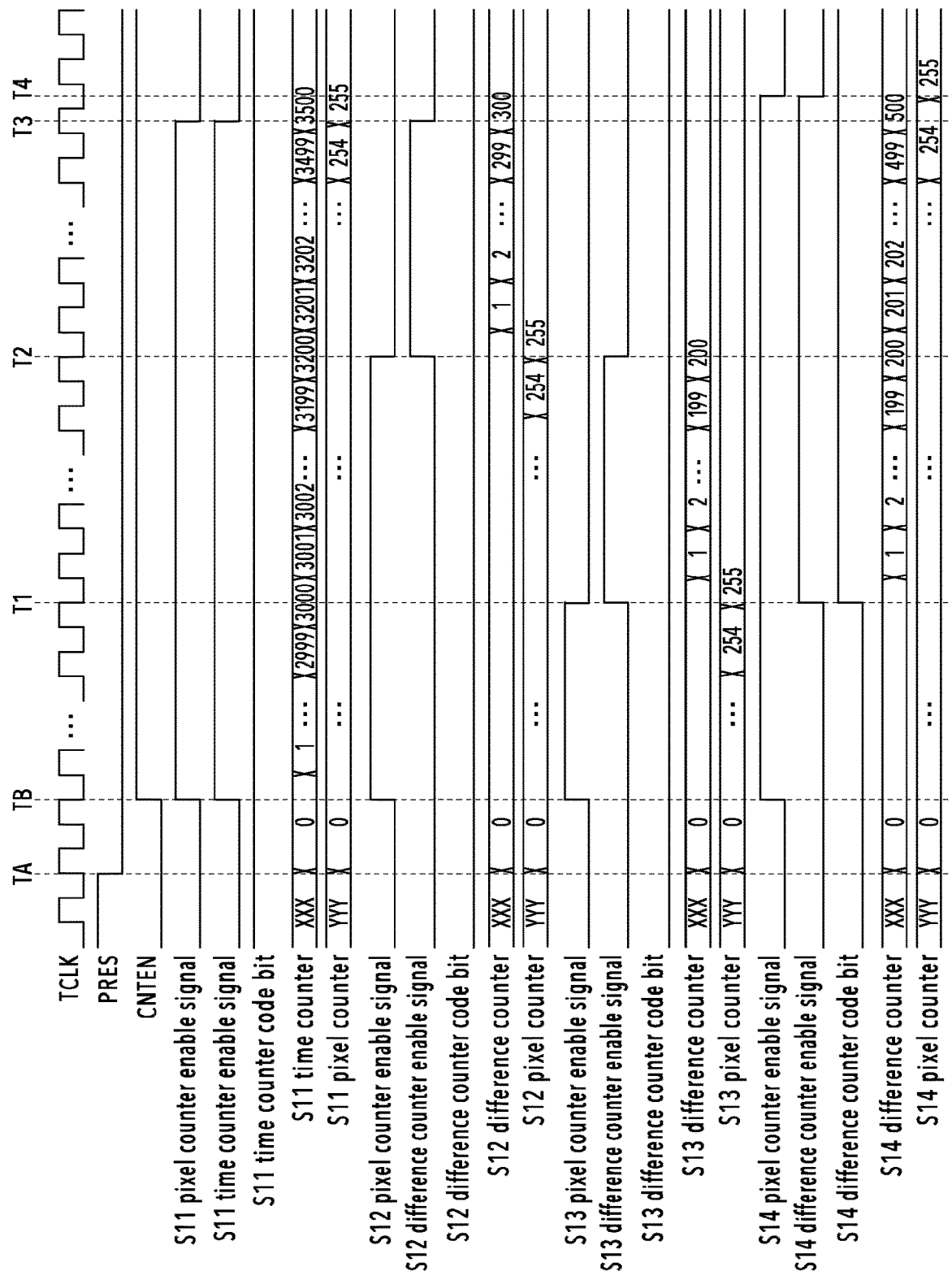
FIG. 8 is a timing chart showing operations of the pulse processing circuit according to the first embodiment.

FIG. 8 is a timing chart showing the operation of the pulse processing circuit 220 according to the present embodiment. For convenience of explanation, only the signal processing circuits 103 (S11 to S14) arranged in the first to fourth columns in the first row are shown and the other signal processing circuits 103 are omitted. Then, in the example in FIG. 8, the configuration is such that the time measurement circuit 222 within the S11 functions as a time counter and the time measurement circuits 222 within S12 to S14 function as a difference counter. Then, the difference counter within S12 measures the difference from S11, the difference counter within the S13 measures the difference from S12, and the difference counter within S14 measures the difference from S13. First, various signals shown in FIG. 8 are explained.

The pixel counter enable signal is a signal that controls the count period of time of the pixel counter 221 corresponding to each of S11 to S14. In the present embodiment, only in a case where the pixel counter enable signal is "High", the pixel counter 221 performs count in response to the pulse of the pulse generation circuit 210. In a case where the pulse count value of the pixel counter reaches the saturated value, the pixel counter enable signal becomes "Low" by the time measurement control circuit 230.

A time counter enable signal is a signal that controls the count period of time in the time measurement circuit 222 functioning as a time counter. The time counter enable signal becomes "High" at timing at which it is possible to start time count from the start of exposure. Then, at timing at which the pixel counter enable signal of the same signal processing circuit (here, S11) becomes "Low", the time counter enable signal becomes "Low" so that the time count is stopped at the same time.

A time counter code bit is a signal that indicates positive/negative of the time count value of the time counter. In the present embodiment, "High" is taken to be positive and "Low" to be negative and in the timing chart in FIG. 8, always "1".

A difference counter enable signal is a signal that controls the count period of time in the time measurement circuit 222 functioning as a difference counter. For example, the difference counter of S13 performs time count in a case where the pixel counter enable signal for one of S12 for which to take a difference and S13 to which the difference counter itself belongs is "High". That is, only in the situation such as this, the difference counter enable signal becomes "High".

A difference counter code bit is a signal that indicates positive/negative of the time count value of the difference counter. In the present embodiment, "High" is taken to be positive and "Low" is taken to be negative. Consequently, in a case where the pixel counter of the signal processing circuit to which the pixel counter itself belongs saturates earlier than the pixel counter of the signal processing circuit for which to take a difference, the difference counter code bit becomes "Low". On the other hand, in a case where the order of saturation is opposite (that is, in a case where the pixel counter of the signal processing circuit to which the pixel counter itself belongs saturates later than the pixel counter of the signal processing circuit for which to take a difference), the difference counter code bit becomes "High". In a case where the pixel counter of the signal processing circuit for which to take a difference and the pixel counter of the signal processing circuit to which the pixel counter itself belongs saturate at the same time, the difference is "0", and therefore, the difference counter code bit may be either "High" or "Low".

T1 to T4 each show timing at which the pixel counter of each of S11 to S14 saturates. Here, at the timing T1 at which the time count value of the time counter of S11 becomes "3000", the pixel counter of S13 saturates (pulse count value reaches "255"). Further, at the timing T2 at which the time count value of the time counter of S11 becomes "3200", the pixel counter of S12 saturates (pulse count value reaches "255"). Furthermore, at the timing T3 at which the time count value of the time counter of S11 becomes "3500", the pixel counter of S11 saturates (pulse count value reaches "255"). Then, the pixel counter of S14 also saturates (pulse count value reaches "255") at the same timing T4 as the timing T3 at which the time count value of the time counter of S11 becomes "3500". That the pixel counter associated with the reference time counter saturates last is not mandatory.

TA indicates the fall timing of the control signal PRES (that is, timing at which time counter and pixel counter are reset).

TB indicates the rise timing of the control signal CNTEN. In the example in FIG. 8, this timing coincides with the fall timing of the control signal TCLK, but this is not mandatory.

Next, the change of each signal described above is explained.

First, as regards S13, at the timing T1 at which the time count value of the time counter of S11 reaches "3000", the pixel counter of its own saturates and the pixel counter enable signal of S13 becomes "Low". At this time, the pixel counter in S12 for which to take a difference does not saturate yet, and therefore, at the timing T1, the difference counter enable signal of S13 becomes "High" and the difference counter of S13 starts count from the next rise of TCLK. The pixel counter of S13 has saturated earlier than the pixel counter of S12, and therefore, the difference counter code bit of S13 is "Low" indicating negative. Similarly, at the timing T1, the pixel counter of S14 does not saturate yet, and therefore, the difference counter enable signal of S14 becomes "High" and the difference counter of S14 starts count from the next rise of TCLK. The pixel counter of S14 saturates later than the pixel counter of S13, and therefore, the difference counter code bit of S14 is "High" indicating positive.

Next, as regards S12, at the timing T2 at which the time count value of the time counter reaches "3200", the pixel counter of its own saturates and the pixel counter enable signal of S12 becomes "Low". At this time, the pixel counter in S11 for which to take a difference does not saturate yet, and therefore, at the timing T2, the difference counter enable signal of S12 becomes "High" and the difference counter of S12 starts time count from the next rise of TCLK. The pixel counter of S12 has saturated earlier than the pixel counter of S11, and therefore, the difference counter code bit of S12 is "Low" indicating negative. Further, the pixel counter of S13 has already saturated, and therefore, at the timing T2, the difference counter enable signal of S13 becomes "Low" and the difference counter of S13 stops time count.

Next, as regards S11, at the timing T3 at which the time count value of the time counter reaches "3500", the pixel counter of its own saturates and the pixel counter enable signal of S11 becomes "Low". Here, the time counter is provided in S11, and therefore, at the timing T3, the time counter enable signal of S11 becomes "Low" and the time counter stops time count. Further, the pixel counter of S12 has already saturated, and therefore, at the timing T3, the difference counter enable signal of S12 becomes "Low" and the difference counter of S12 stops time count.

Then, as regards S14, at the timing T4 at which the time count value of the time counter reaches "3500", the pixel counter of its own saturates and the pixel counter enable signal of S14 becomes "Low". Further, the pixel counter in S13 for which to take a difference has already saturated, and therefore, at the timing T4, the difference counter enable signal of S14 becomes "Low" and the difference counter of S14 stops time count.

It is possible to obtain the time required for the pixel counter 221 associated with the time measurement circuit 222 functioning as a difference counter to saturate actually by sequentially reading out the time value stored in the storage circuit 302 and adding or subtracting the time count value of the difference counter. In the example shown in FIG. 8, the saturation time of the pixel counter 221 within each signal processing circuit 103 is as follows.

saturation time of pixel counter of $S11$=time count value of time counter=3500 saturation time of pixel counter of $S12$=stored time value−time count value of difference counter of $S12$=3500−300=3200 saturation time of pixel counter of $S13$=stored time value−time count value of difference counter of $S13$=3200−200=3000 saturation time of pixel counter of $S14$=stored time value+time count value of difference counter of $S14$=3000+500=3500

As described above, it is possible to accurately obtain the saturation time of each pixel counter by the calculation processing. The timing chart, High/Low of each signal, and the numbers of bits of various counters illustrated in FIG. 8 are an example that satisfies the present embodiment and not limited to the above-described example.

As above, in the present embodiment, by combining the time counter and the difference counter, the accuracy is implemented, which is equivalent to that in a case where all the time counters are configured to have a high time resolution. According to the imaging sensor having the signal multiplication pixel structure of the present embodiment, in a case of a general image capturing scene in which there is no extreme difference in luminance between pixels, the drive time of the counter for measuring the exposure time is reduced, and therefore, it is possible to reduce power consumption accompanying exposure time measurement. In a case where the configuration of the present embodiment is adopted, new wiring and additional circuits for obtaining a difference and processing to calculate the actual saturation time from the obtained difference are necessary, but the influence on the circuit scale is slight and the merit due to a reduction in power consumption is greater.

Second Embodiment

In the first embodiment, it is premised that the number of bits of the time counter and the number of bits of the difference counter are the same. However, by limiting the signal processing circuit for which to take a difference to the signal processing circuit of the pixel of the same color and the pixel in the vicinity thereof, the difference becomes small, and therefore, it is possible to obtain a difference with no problem even in a case where the number of bits of the difference counter is small. Further, even in a case where counting a difference fails, it is also possible to predict the original difference value by liner interpolation and the like. Consequently, an aspect is explained as a second embodiment in which the circuit scale of the difference counter is made smaller by reducing the number of bits of the difference counter less than the number of bits of the time counter.

<Details of Pulse Processing Circuit>

Figure 9:
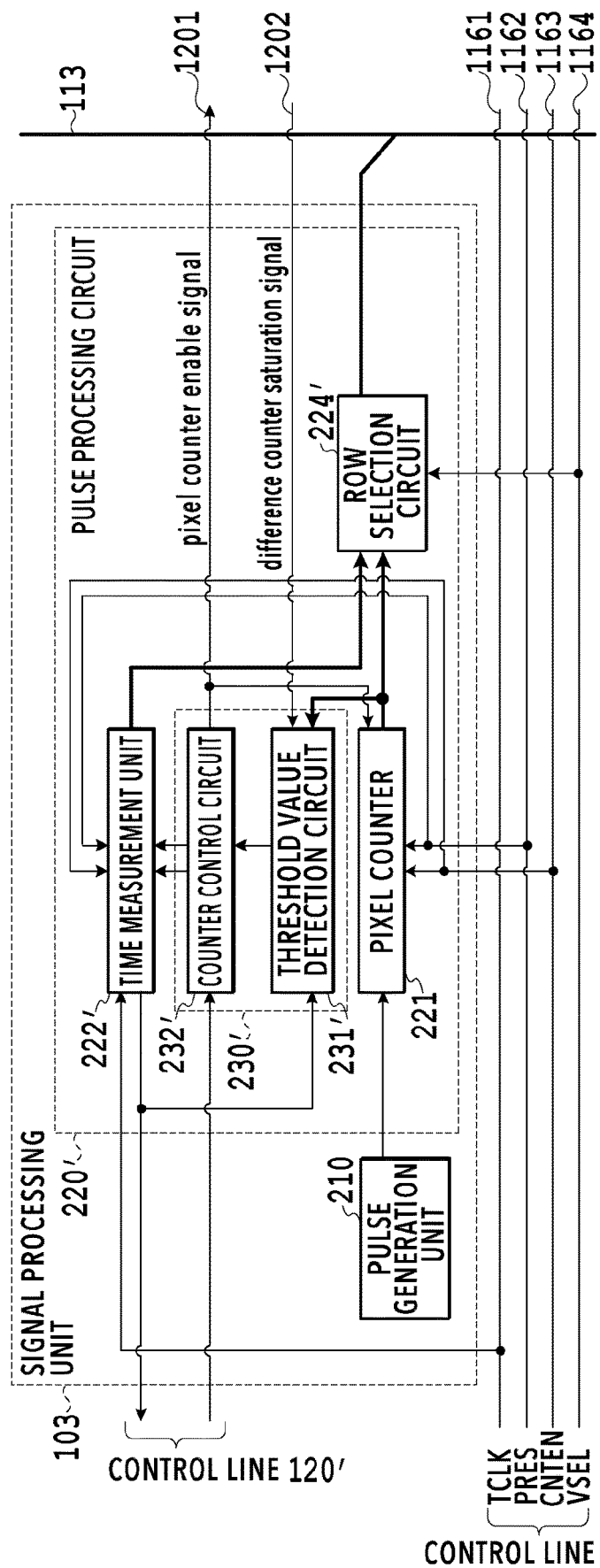
FIG. 9 is a diagram showing an internal configuration of a pulse processing unit or circuit according to a second embodiment.

FIG. 9 is a diagram showing the internal configuration of a pulse processing circuit 220' according to the present embodiment. Similar to the pulse processing circuit 220 of the first embodiment, the pulse processing circuit 220' includes the pixel counter 221, a time measurement circuit 222', a row selection circuit 224', and a time measurement control circuit 230', but does not have the selector 223. Similar to the time measurement control circuit 230 of the first embodiment, the configuration of the time measurement control circuit 230' includes a threshold value detection circuit 231' and a counter control circuit 232'.

In a control line 120', a pixel counter enable signal 1201 and a difference counter saturation signal 1202 are included. The signal processing circuit 103 is connected with another signal processing circuit 103 via the control line 120'. In the following, explanation of the contents in common to those of the pulse processing circuit 220 of the first embodiment is omitted and different points are explained mainly.

The number of bits of the counter in a case where the time measurement circuit 222' functions as a difference counter is different from that in a case where the time measurement circuit 222' functions as a time counter. Specifically, in a case where the time counter is a 14-bit counter, the difference counter is a 10-bit counter, and so on. Consequently, in a case of the time measurement circuit 222' that functions as a difference counter, theoretically, a difference exceeding the maximum value that can be counted with the number of bits of the difference counter may occur. Because of this, the time measurement circuit 222' as a difference counter stops time count in a case where the count value reaches the maximum value that can be counted. Further, the time measurement circuit 222' notifies the threshold value detection circuit 231' and another signal processing circuit 103 connected by the control line 120' that the time count is stopped by the difference counter saturation signal 1202.

Upon receipt of the notification of saturation from the time measurement circuit 222' as a difference counter, the threshold value detection circuit 231' stops pulse count of the pixel counter 221 via the counter control circuit 232'. Further, upon receipt of the notification of the difference counter saturation signal 1202 from the signal processing circuit 103 for which to take a difference, the threshold value detection circuit 231' stops pulse count of the pixel counter 221 via the counter control circuit 232'. The notification of the signal that causes pulse count to stop is performed by, for example, calculating OR of three signals, that is, a signal that detects saturation of the pixel counter 221, a signal that detects saturation of the time measurement circuit 222', and the difference counter saturation signal 1202

The row selection circuit 224' switches electrical connection/nonconnection between the pixel counter 221 and the signal line 113 and between the time measurement circuit 222' and the signal line 113 by the control signal VSEL that is supplied from the control pulse generation circuit 115 via the vertical scanning circuit 110 and the control line 1164. The row selection circuit 224' includes, for example, a buffer circuit for outputting a signal, and the like. Different from the row selection circuit 224 of the first embodiment, the row selection circuit 224' outputs both the count value of the pixel counter 221 and the count value of the time measurement circuit 222'. The reason is that in a case where the time measurement circuit 222' functions as a difference counter and a difference exceeding the maximum value that can be counted occurs, it may happen sometimes that none of the pulse count value of the signal processing circuit 103 for which to take a difference and the time value obtained by adding or subtracting the difference saturates. In such a case, the output data of the pixel counter 221 or the time measurement circuit 222' is interpolated from both the count values. Specifically, for example, by additionally performing the following calculation processing in the calculation processing circuit 301 (see FIG. 7). the actual time value at which the pixel counter 221 saturates is found.

saturation time of pixel counter=(time value obtained by adding or subtracting difference)×(maximum value of pulse count)±(pulse count value)

It may also be possible to output the pulse count value and the time value as they are, both in the unsaturated state, and write them to the RAM 41 instead of the above-described calculation processing.

<Operation of Pulse Processing Circuit>

Figure 10:
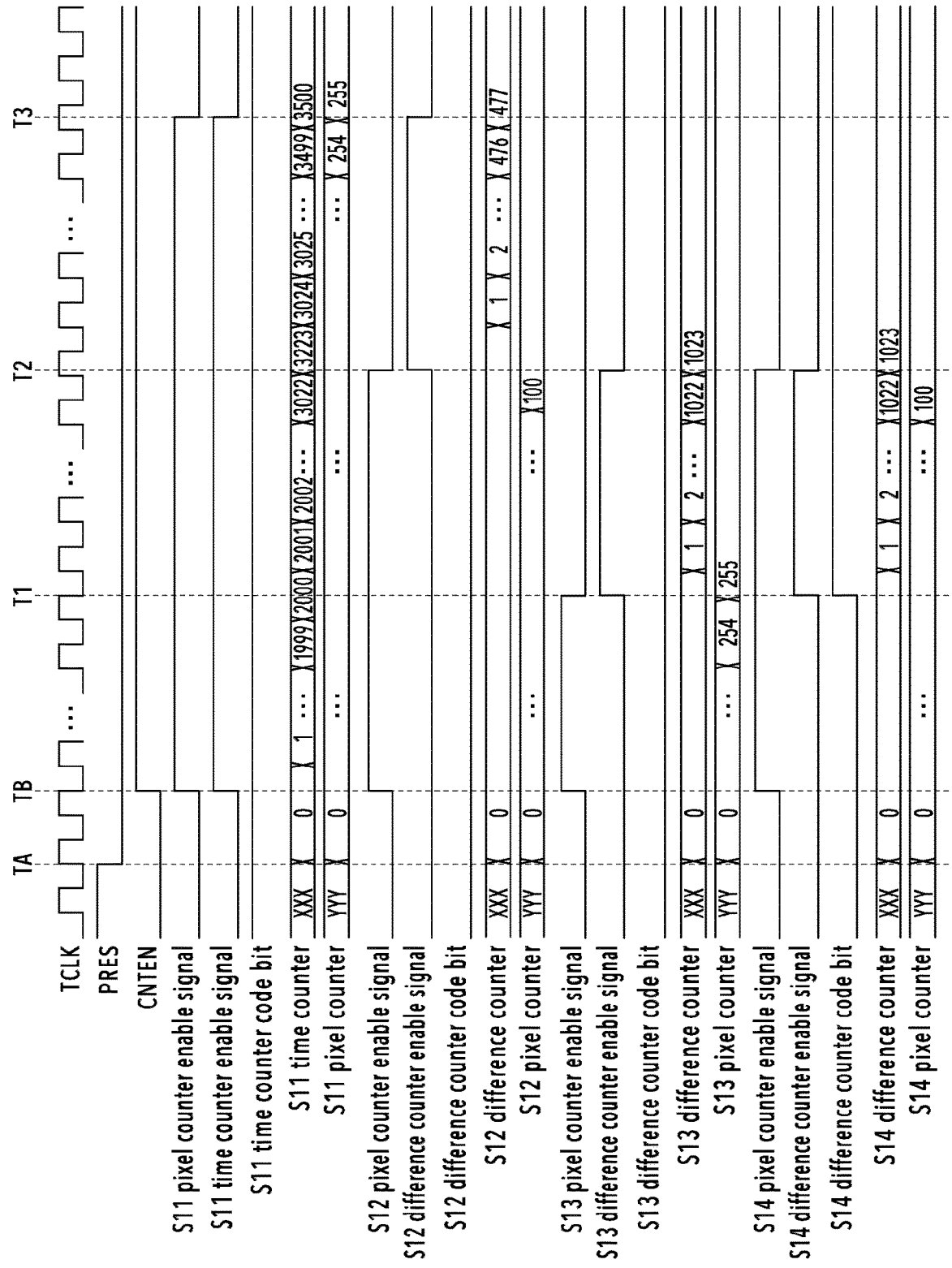
FIG. 10 is a timing chart showing operations of the pulse processing circuit according to the second embodiment.

FIG. 10 is a timing chart showing the operation of the pulse processing circuit 220' according to the present embodiment. In the timing chart in FIG. 10, explanation is given by supposing the operation in a case where a difference exceeding the bit width of the difference counter occurs.

First, as regards S13, different from the timing chart in FIG. 8, at the timing T1 at which the time count value of the time counter reaches "2000", the pixel counter saturates particularly early and the pixel counter enable signal of S13 becomes "Low". At this time, the pixel counter of S12 for which to take a difference does not saturate yet, and therefore, at the timing T1, the difference counter enable signal of S13 becomes "High" and the difference counter of S13 starts time count from the next rise of TCLK. The pixel counter of S13 has saturated earlier than the pixel counter of S12, and therefore, the difference counter code bit of S13 is "Low" indicating negative. Similarly, at the timing T1, the pixel counter of S14 does not saturate yet, and therefore, the difference counter enable signal of S14 becomes "High" and the difference counter of S14 starts time count from the next rise of TCLK. The pixel counter of S14 saturates later than the pixel counter of S13, and therefore, the difference counter code bit of S14 is "High" indicating positive.

Here, the time count value of the difference counter of S13 reaches the maximum value "1023" that can be represented with ten bits at the timing T2 at which the time count value of the time counter reaches "3023". Due to this, at the timing T2, the difference counter enable signal of S13 becomes "Low" and at that point of time, the difference counter of S13 stops time count. Because the difference counter enable signal of S13 becomes "Low", although the pixel counter of S12 does not saturate yet, at the timing T2, the pixel counter enable signal of S12 is switched to "Low". Accompanying this, at the timing T2, the difference counter enable signal of S12 becomes "High" and the difference counter of S12 starts time count from the next rise of TCLK. The difference counter of S12 starts difference time count earlier than the time counter of S11 starts time count, and therefore, the difference counter code bit of S12 enters the state of "Low" indicating negative.

Then, the time count value of the difference counter of S14 reaches the maximum value "1023" that can be represented with ten bits at the timing T2 at which the time count value of the time counter reaches "3023". Due to this, at the timing T2, the difference counter enable signal of S14 becomes "Low" and at that point of time, the difference counter of S14 stops time count. Because the difference counter enable signal of S14 becomes "Low", although the pixel counter of S14 does not saturate yet, at the timing T2, the pixel counter enable signal of S14 is switched to "Low". At this time, at the timing T2, the difference counter enable signal of S13 and the pixel counter enable signal of S13 are "Low", and therefore, the time measurement control circuit 230 of S13 does not perform control.

The control at the timing T3 is the same as that in the timing chart in FIG. 8, and therefore, explanation is omitted.

In the present embodiment also, it is possible to obtain the time required for each pixel counter to saturate actually by sequentially reading out the time value stored in the storage circuit 302 and adding or subtracting the time count value of the difference counter. In the example shown in FIG. 10, the saturation time of the pixel counter within each signal processing circuit is as follows.

saturation time of pixel counter of S11=time count value of time counter=3500 saturation time of pixel counter of S12=stored time
    value−time count value of difference counter of
    S12=3500−477=3023 saturation time of pixel counter of S13=stored time
    value−time count value of difference counter of
    S13=3023−1023=2000 saturation time of pixel counter of S14=stored time
    value+time count value of difference counter of
    S14=2000+1023=3023

As described above, it is possible to accurately obtain the saturation time of each pixel counter by the calculation processing. The timing chart, High/Low of each signal, and the number of bits of the counter illustrated in FIG. 10 are an example that satisfies the present embodiment and not limited to the above-described example.

As above, according to the present embodiment, by reducing the number of bits of the difference counter with attention being focused on the fact that the difference between pixels is slight under a certain image capturing condition, it is also possible to obtain the effect of a reduction in circuit scale, in addition to a reduction in power consumption of the time measurement circuit.

Third Embodiment

In the first and second embodiments, the configuration is explained in which one pixel has one time measurement circuit. Next, a configuration is explained as a third embodiment in which a plurality of pixels has one time measurement circuit, that is, a configuration in which the time measurement circuit is shared by a plurality of pixels.

Figure 11:
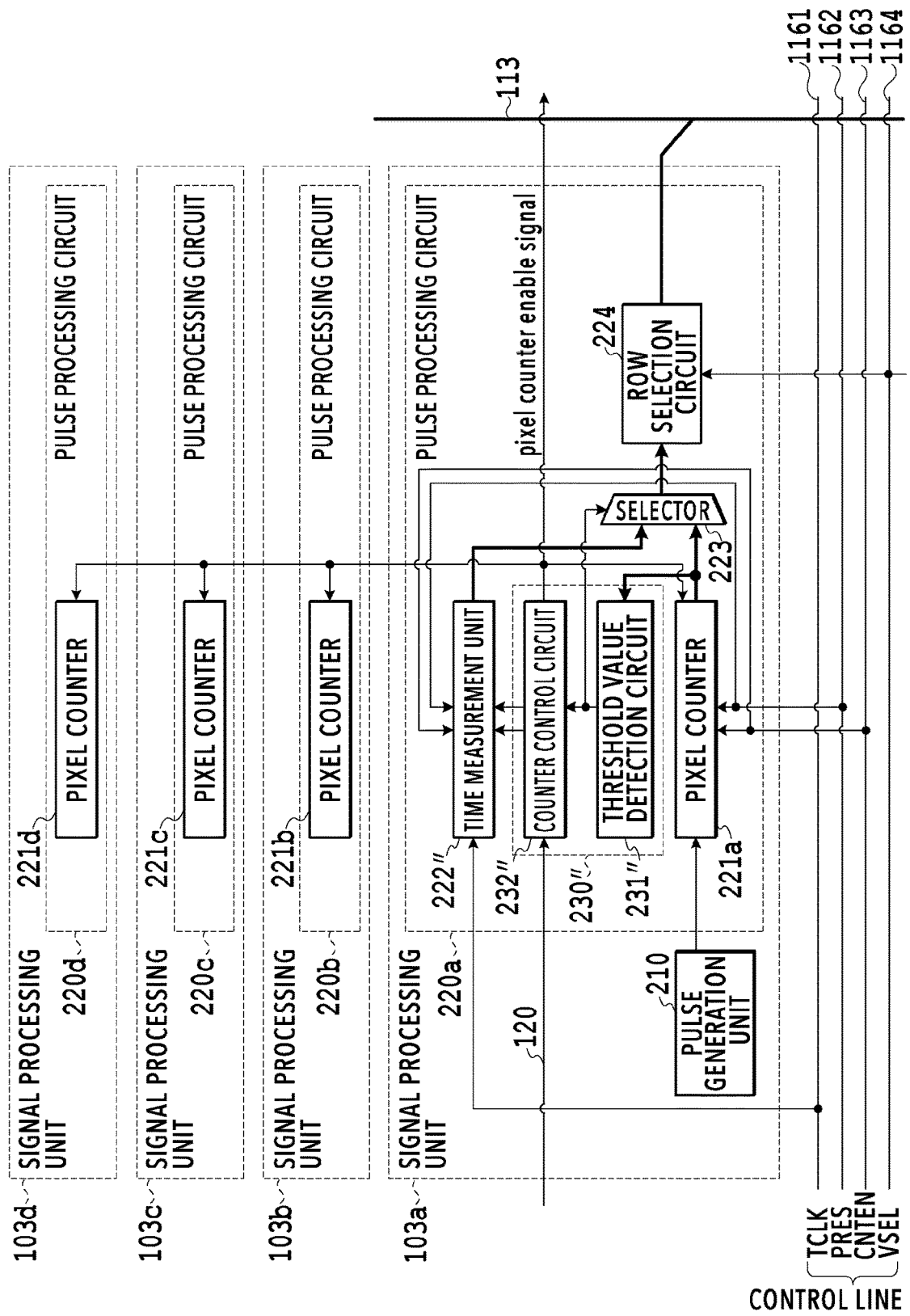
FIG. 11 is a diagram showing a circuit configuration in a case where a unit of four pixels has one time measurement circuit according to a third embodiment.

FIG. 11 is a diagram showing a circuit configuration in a case where a unit of four pixels has one time measurement circuit according to the present embodiment. In the following, explanation of the items in common to those of the first and second embodiments is omitted and different points are explained mainly.

Four signal processing circuits 103a to 103d shown in FIG. 11 correspond to four pixels, respectively. Then, the configuration is such that a time measurement circuit 222" within the signal processing circuit 103a measures the saturation time of pixel counters 221b to 221d in the other signal processing circuits 103b to 103d. For example, in a case where this configuration is applied to the signal processing circuit array (pixel circuit area 22) shown in FIG. 3 described previously, for example, S 11 is taken to be the signal processing circuit 103a having the time measurement circuit 222" as a time counter and S12, S21, and S22 are taken to be the signal processing circuits 103b to 103d, respectively. Then, for example, S13 is taken to be the signal processing circuit 103a having the time measurement circuit 222" as a difference counter and S14, S23, and S24 are taken to be the signal processing circuits 103b to 103d, respectively. As described above, a pixel group including four pixels is handled as one circuit.

Here, it is assumed that only the pixel that is connected to the signal processing circuit 103a does not mount a color filter and the other three pixels connected to the signal processing circuits 103b to 103d, respectively, mount R (red), G (green), and B (blue) color filters, respectively. In this case, a pixel counter 221a of the signal processing circuit 103a saturates earlier without exception than the pixel counters 221b to 221d of the other signal processing circuits 103b to 103d. In a case of detecting that the pulse count value of the pixel counter 221a has reached the saturated value, a threshold value detection circuit 231" notifies a counter control circuit 232" of that. Upon receipt of this notification, the counter control circuit 232" sets the pixel counter enable signal to "Low" and stops pulse count of the pixel counter 221a. Further, this pixel counter enable signal is not only connected to another signal processing circuit 103 having the time measurement circuit as the control line 120 but also to the pixel counters 221b to 221d within the other signal processing circuits 103b to 103d. Consequently, as the pixel counter 221a does, the pixel counters 221b to 221d also stop pulse count.

In the specific example described above, the pixel counters 221b to 221d do not saturate earlier than the pixel counter 221a, and therefore, the output format of the signal processing circuits 103b to 103d is the output format in FIG. 6A explained in the first embodiment.

Explanation has been given by premising the configuration in which the pixel counter 221a saturates earlier without exception than the other pixel counters 221b to 221d, but the configuration is not limited to this. For example, it may also be possible to cause the above-described four signal processing circuits 103a to 103d to respectively correspond to four pixels (Bayer array) mounting R, G, G, and B color filters, respectively, in each pixel. In this case, it is sufficient to design a configuration in which signal lines that connect the four pixels with one another are provided separately and in a case where one of the pixel counters saturates, the pulse count in the time measurement circuit 222" and in the other pixel counters is stopped.

In a case of the present embodiment, calculation of the actual saturation time is performed by using only the output of the signal processing circuit 103a having the time measurement circuit 222" functioning as a time counter or a difference counter. Consequently, for example, a dedicated signal line for determining the output of the signal processing circuit 103 having the time measurement circuit 222" is provided in the signal processing circuit 103a or the column circuit 112 (see FIG. 3).

Modification Example

In the present embodiment, the configuration in which a unit of four pixels shares one time measurement circuit is explained, but the configuration is not limited to this and a configuration may be accepted in which a unit of 16 pixels shares one time measurement circuit.

Further, a configuration may also be accepted in which each row or each plurality of rows, or each column or each plurality of columns shares one time measurement circuit.

Fourth Embodiment

In the first to third embodiments, explanation is given by taking the configuration as an example in which the time counter is arranged in the signal processing circuit 103 located in the leftmost column (n=1) in each row in the signal processing circuit array and the difference counter is arranged in the other signal processing circuits 103. However, the position at which the time counter is arranged is not limited to the above-described example. Next, variations of arrangement of the time counter that can be applied in the first to third embodiments are explained as a fourth embodiment. In the following, the portions in common to those explained in the first embodiment are omitted and different points are explained mainly.

Arrangement Example 1

Figure 12:
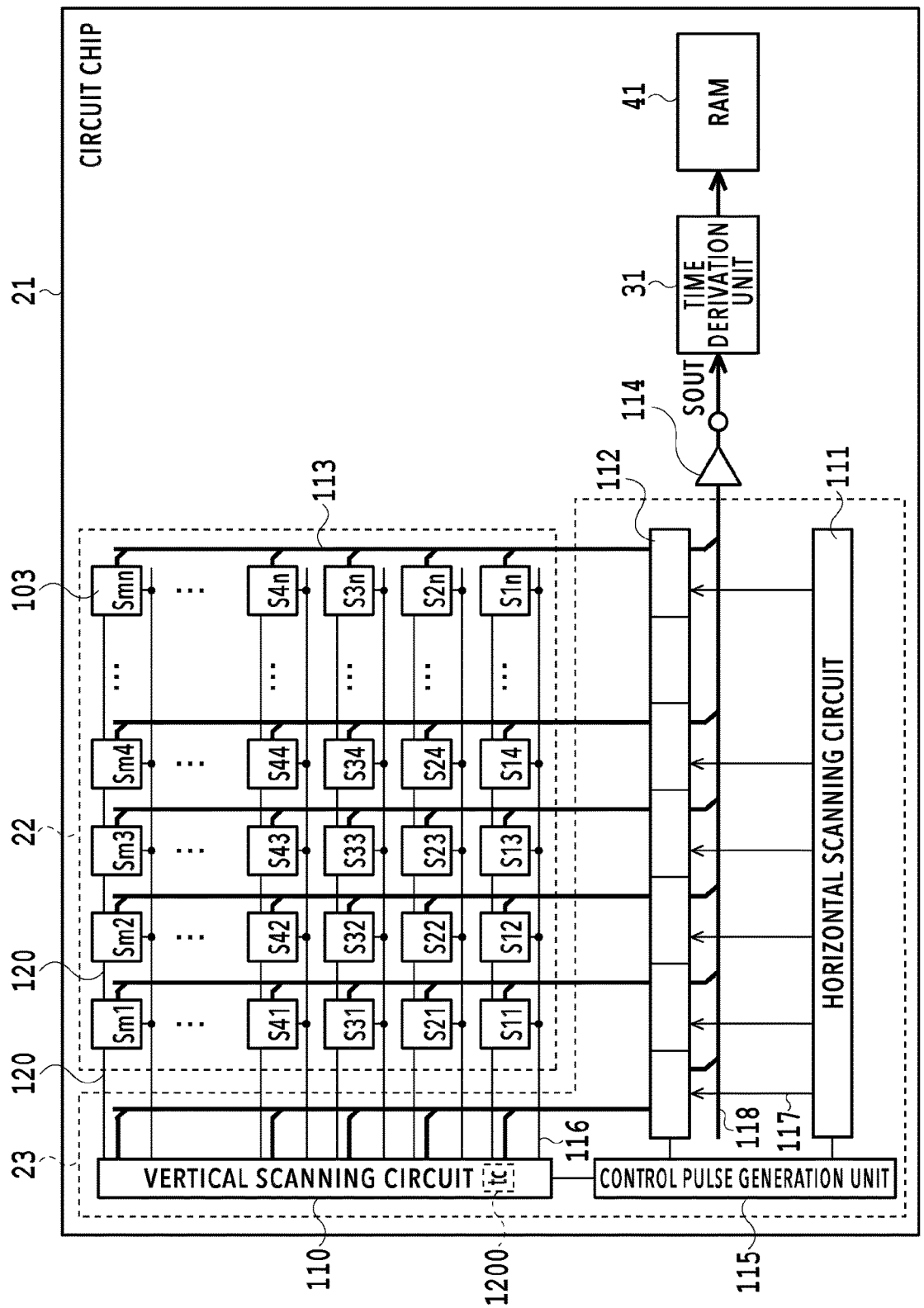
FIG. 12 is a diagram showing a configuration example of a circuit chip according to a fourth embodiment.

In a configuration example of the circuit chip 21 shown in FIG. 12, the time counter is arranged inside the vertical scanning circuit 110 and all the time measurement circuits 222 of each signal processing circuit 103 in the signal processing circuit array are caused to function as a difference counter. Then, the time measurement circuit 222 of the signal processing circuit 103 located in the leftmost column (n=1) in each row in the signal processing circuit array measures the different from the time counter within the vertical scanning circuit 110. For example, in a case of receiving the timing at which the pixel counter 221 in the signal processing circuit 103 located in the leftmost column in each row has saturated via the control line 120, the time counter within the vertical scanning circuit 110 stops time count. The number of time counters arranged within the imaging sensor is only required to be one or more but the number is not limited. Further, the position at which the time counter is arranged may be inside the control pulse generation circuit 115. In a case of the configuration example in FIG. 12, the time count value of the time counter within the vertical scanning circuit 110 is read out and stored in the column circuit 112. Then, in a case of receiving a control signal from the horizontal scanning circuit 111, the column circuit 112 outputs the stored signal to the output circuit 114 via the horizontal output line 118. The output of the vertical scanning circuit 110 at this time is in conformity with the output format shown in FIG. 6B. It may also be possible for the column circuit 112 to add one or more of the counter flag 611, the difference flag 612, and the code bit 613 other than the time count value 614. Further, the connection method between the vertical scanning circuit 110 and the signal processing circuit 103 and the connection method between the signal processing circuits are not limited to the methods shown in FIG. 12.

In the configuration example in FIG. 12, by causing the time measurement circuits 222 of all the signal processing circuits 103 to function as a difference counter, it is possible to make common all the circuits within the signal processing circuit array, and therefore, improve easiness in design. Particularly, in a case where the configuration example is applied to the second embodiment in which the number of bits of the difference counter is made less than the number of bits of the time counter, the reduction effect of the circuit scale improves more.

Arrangement Example 2

Figure 13:
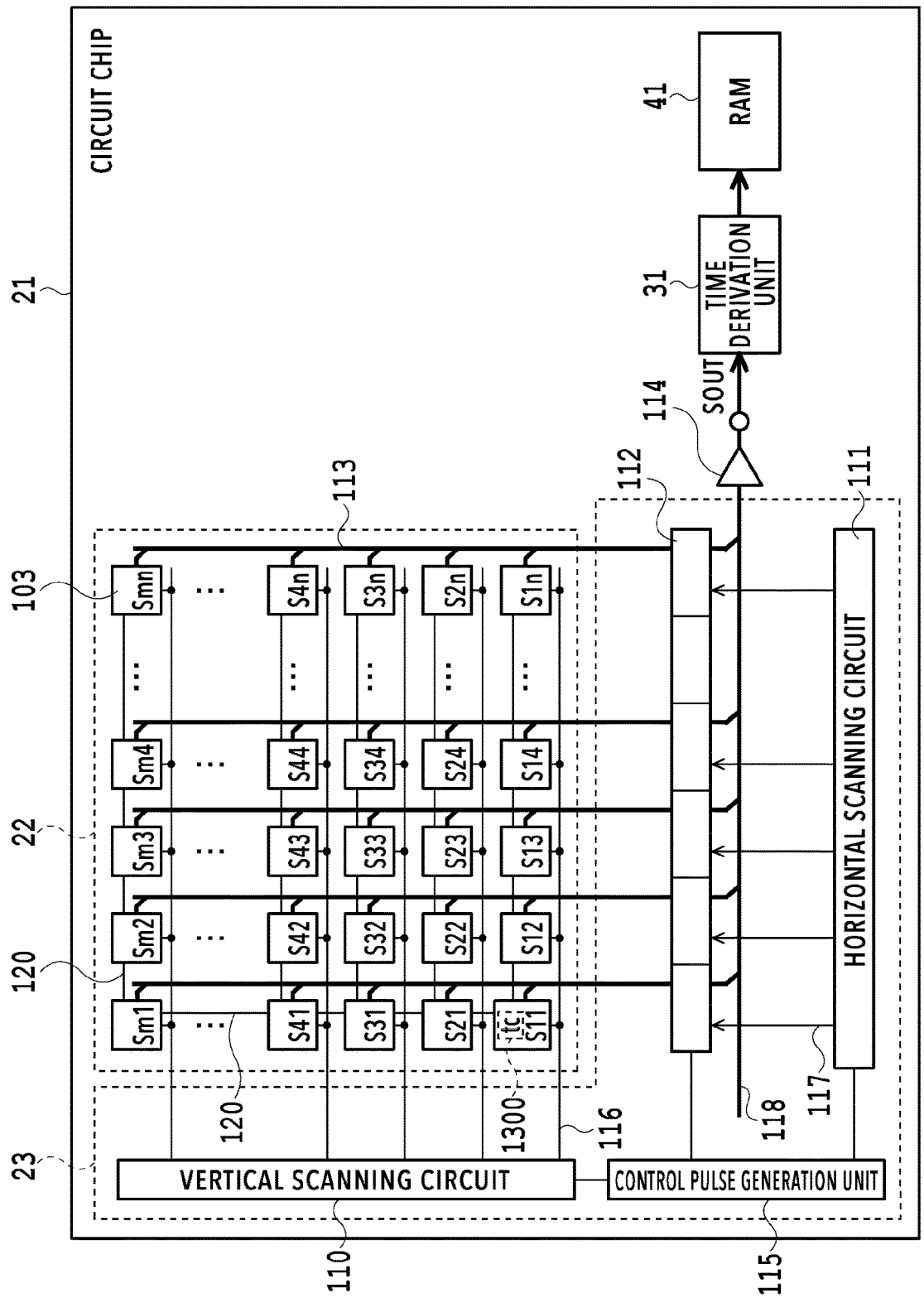
FIG. 13 is a diagram showing a configuration example of a circuit chip according to the fourth embodiment.

In a configuration example of the circuit chip 21 shown in FIG. 13, among the time measurement circuits 222 of each signal processing circuit 103 within the signal processing circuit array, only the specific time measurement circuit 222 (for example, only S11) functions as a time counter and the other time measurement circuits 222 function as a difference counter. Then, in a case where only the time measurement circuit 222 of S 11 functions as a time counter, each signal processing circuit 103 in the first column connects the signal processing circuits adjacent to one another in the vertical direction by the control line 120.

In the configuration example in FIG. 13 in which only S11 has the time counter, the time measurement circuit 222 of the signal processing circuit 103 in each of the second column to the nth column in each row measures the difference from the time count value of the time measurement circuit 222 of the signal processing circuit 103 located to left thereof. Then, the time measurement circuit 222 of each of S21 to Sm 1, which are the signal processing circuits other than S11 in the first column, measures the difference from the time count value of the time measurement circuit 222 of the signal processing circuit 103 located immediately below itself in FIG. 13. At this time, the time count value of the time measurement circuit 222 in the first column is used a plurality of times in the calculation processing in the calculation processing circuit 301, and therefore, a plurality of storage circuits for storing the time value, which is the results of the calculation processing, is necessary. Specifically, two storage circuits are necessary, that is, a storage circuit for storing the saturation time of the pixel counter located to left in each column and a storage circuit for storing the saturation time of the pixel counter located immediately below in the first column in each row. Further, the output format needs to be changed accordingly.

It may also be possible to design a configuration in which the processing that is to be performed by the signal processing circuit 103 in the first column in FIG. 13 is performed inside the vertical scanning circuit 110.

In the configuration example in FIG. 13, the number of time counters is reduced further, and therefore, it is possible to further reduce power consumption. Particularly, in a case where the configuration example is applied to the second embodiment in which the number of bits of the difference counter is made less than the number of bits of the time counter, the reduction effect of the circuit scale improves more. Further, in the first and second embodiments, there is a case where in the pixel 101 to which the adjacent signal processing circuit 103 is connected, a color filter different in color from that in the pixel 101 to which the signal processing circuit 103 itself is connected is mounted. In such a case, by connecting the signal processing circuits 103 corresponding to the pixels 101 in which the same color filter is mounted by the control line 120, the time required for the pixel counter of the connected signal processing circuit 103 to saturate is close to that of the other pixel counter. Due to this, it is possible to reduce power consumption. For example, in a case where the color filter that is mounted in the pixel 101 in the even-numbered columns is different from that mounted in the pixel 101 in the odd-numbered columns, by arranging the control line 120 also in the column direction in the second column, it is possible to implement the same processing.

Arrangement Example 3

Figure 14:
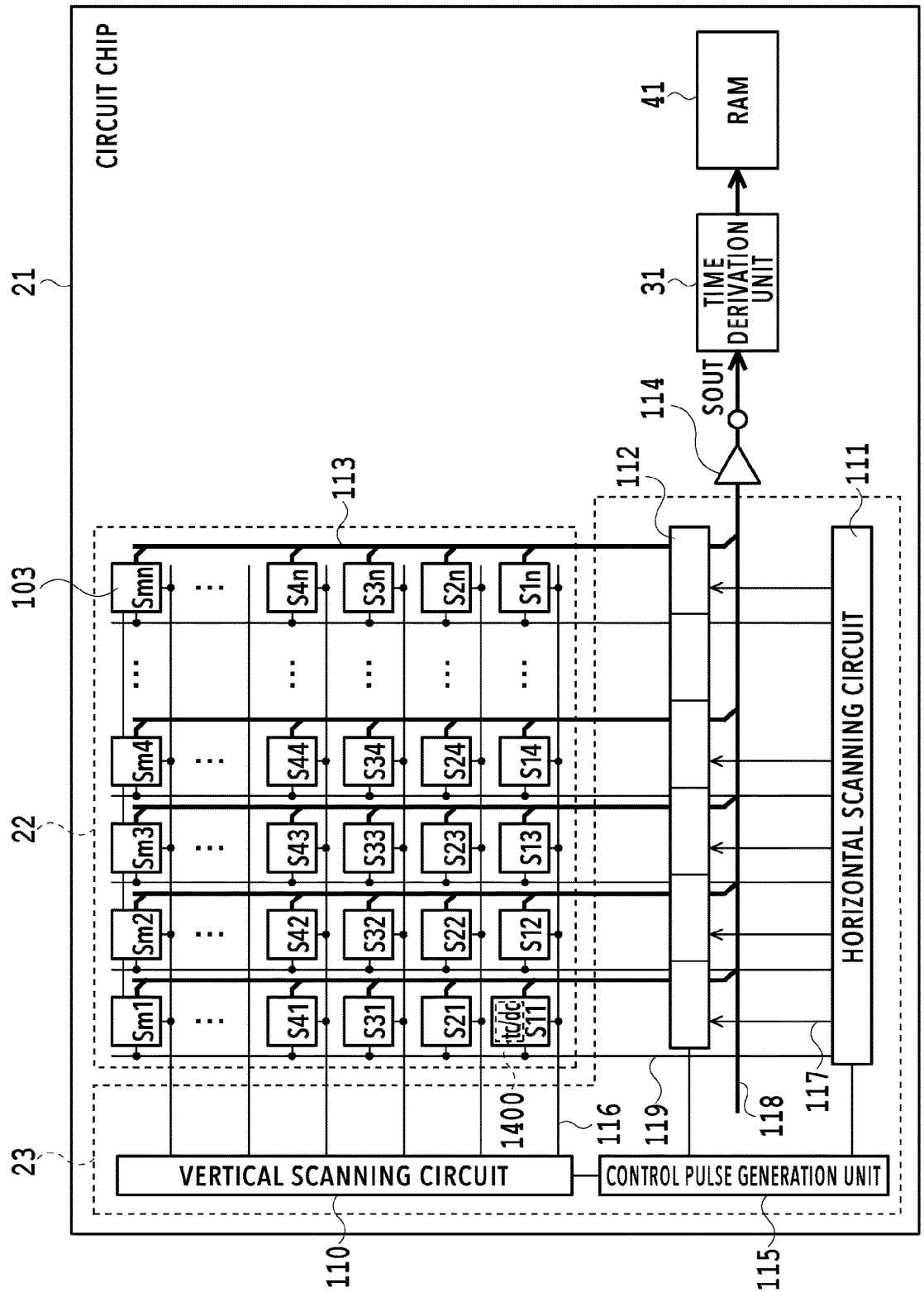
FIG. 14 is a diagram showing a configuration example of a circuit chip according to the fourth embodiment.

In a configuration example of the circuit chip 21 shown in FIG. 14, the time measurement circuit 222 of the signal processing circuit 103 is configured to be capable of functioning as both a time counter and a difference counter and it is made possible to select as which of the time counter and the difference counter the time measurement circuit 222 is caused to function in accordance with a use case. In the example in FIG. 14, in addition to the control line 116 in the horizontal direction, a control line 119 is arranged also in the vertical direction. It is possible for the vertical scanning circuit 110 and the horizontal scanning circuit 111 to set the position of the time counter for each row or for each column for the time measurement circuit 222 in each row and in each column via the control line 116 and the control line 119. Here, for example, it is assumed that only the right-half image of the image corresponding to the entire surface of the pixel area 12 of the imaging sensor 100 is desired to be obtained. In this case, it is sufficient to select the time measurement circuit 222 of the signal processing circuit 103 located on the leftmost end in each row of the right half of the signal processing circuit array as a time counter and the time measurement circuit 222 of each signal processing circuit 103 located to right thereof as a difference counter. As described above, by arranging the time measurement circuit as a time counter at the position corresponding to the pixel located at the end portion of each pixel configuring the cutout-target image area, it is possible to efficiently obtain only an arbitrary image area of the entire image that the imaging sensor 100 can obtain.

<Details of Pulse Processing Circuit>

Figure 15:
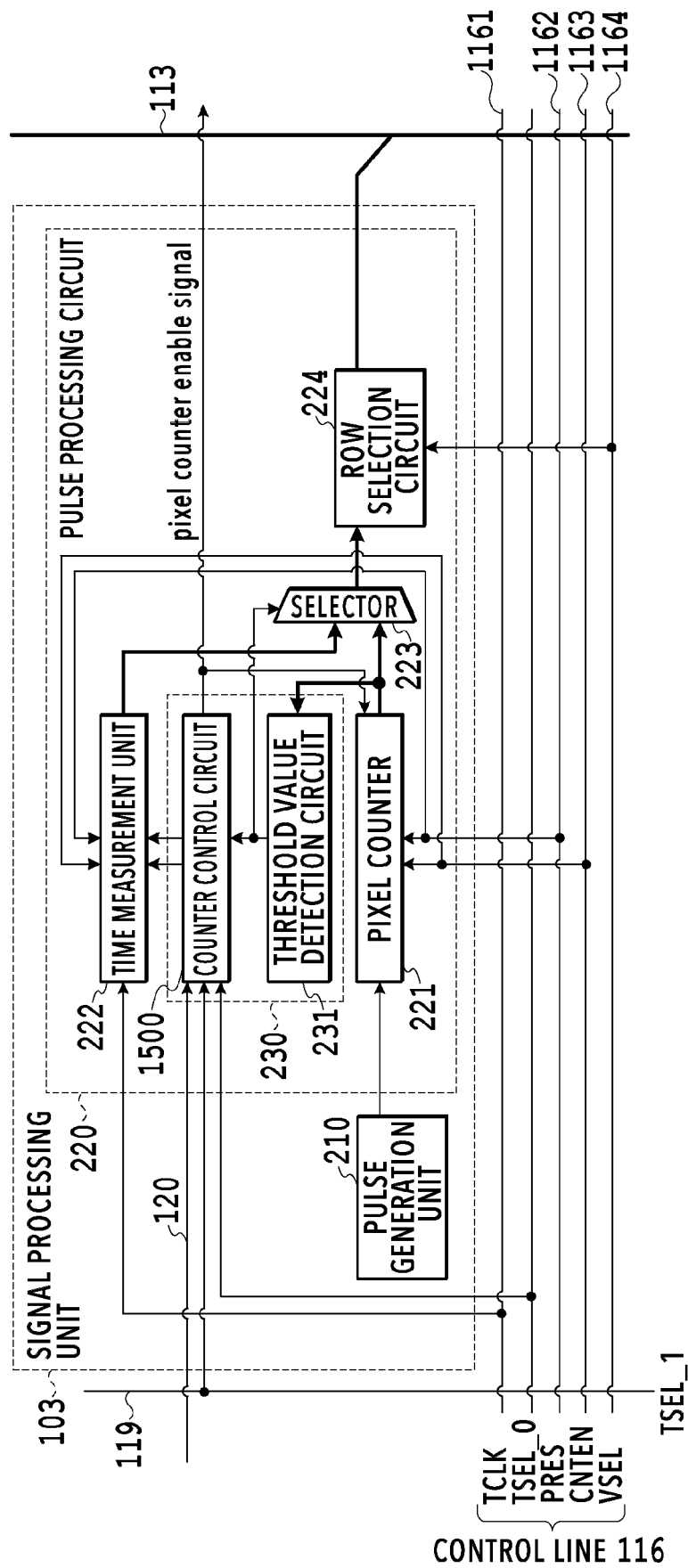
FIG. 15 is a diagram showing a configuration example of a pulse processing unit or circuit according to the fourth embodiment.

It is possible to implement the function selection of the time measurement circuit 222 described above by, for example, the pulse processing circuit 220. FIG. 15 is a diagram showing a configuration example of the pulse processing circuit 220 according to the present embodiment. In the following, attention is focused on only the function selection of the time measurement circuit 222 and the operation thereof is explained.

A counter control circuit 1500 of the present embodiment receives a signal TSEL_0 from the vertical scanning circuit 110 via the control line 116 and receives a signal TSEL_1 from the horizontal scanning circuit 111 via the control line 119. Then, in a case where both TSEL_0 and TSEL_1 are "High", the counter control circuit 1500 immediately notifies the time measurement circuit 222 of the start of time count. Then, in a case of having already received the notification of the start of time count from the counter control circuit 232 at the time of rise of CNTEN (that is, at the time of start of exposure), the time measurement circuit 222 operates as a time counter. On the other hand, in a case of not having received the notification of the start of time count at the time of rise of CNTEN and the notification of the start of time count is received after that, the time measurement circuit 222 operates as a difference counter.

As described above, by configuring the time measurement circuit 222 to be capable of being switched between functioning as a time counter and functioning as a difference counter, it is made possible to cut out an arbitrary image area from the entire image without the need to calculate the saturation time for all the pixels. In the present embodiment, the configuration is such that the counter control circuit 1500 switches the time measurement circuits, but the configuration is not limited to this. For example, in a case where the image area desired to be cut out is known in advance, it may also be possible to set in advance each time measurement circuit 222 as a time counter, which is located at the leftmost portion of each row within the corresponding signal processing circuit array of the image area. The connection methods of the control line 120 in FIG. 12, FIG. 13, and FIG. 14 are an example that satisfies the present embodiment and the connection methods are not limited to those examples shown schematically.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, in an imaging sensor having a signal multiplication pixel structure, it is made possible to suppress power consumption of an exposure time counter.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-195361, filed Dec. 1, 2021 which is hereby incorporated by reference wherein in its entirety.

What is claimed is:

1. An imaging sensor comprising:
    a plurality of pixels including an avalanche photodiode that detects incidence of a photon;
    a plurality of signal processing circuits having a pulse generation circuit configured to generate a pulse based on photon detection in the avalanche photodiode and a pixel counter that counts pulses output from the pulse generation circuit;
    a plurality of time measurement circuits configured to measure a time until the pixel counter saturates, wherein at least one time measurement circuit functions as a time counter that obtains a time from the pixel counter starting count of the pulses until saturation and the other time measurement circuits function as a difference counter that obtains a difference between a time until a certain pixel counter saturates and a time until another pixel counter different from the certain pixel counter saturates;
    a time derivation circuit configured to derive a time from the pixel counter associated with the time measurement circuit that functions as the difference counter starting count of the pulses until saturation; and
    a storage circuit configured to store a time value indicating a time derived by the time derivation circuit for next derivation, wherein
    the time derivation circuit performs the derivation by adding a difference obtained by the time measurement circuit that functions as the difference counter to the time value stored in the storage circuit or subtracting the difference from the time value.

2. The imaging sensor according to claim 1, wherein one of the plurality of time measurement circuits is shared by a plurality of pixels.

3. The imaging sensor according to claim 1, wherein one of the plurality of time measurement circuits is shared by a unit of four pixels.

4. The imaging sensor according to claim 3, wherein
the circuit of four pixels includes a pixel not mounting a color filter, a pixel mounting a red color filter, a pixel mounting a green color filter, and a pixel mounting a blue color filter and
for a pixel counter for the pixel not mounting a color filter, the time measurement circuit is provided.

5. The imaging sensor according to claim 1, wherein
the number of bits of the difference counter is smaller than the number of bits of the time counter.

6. The imaging sensor according to claim 1, wherein
the time measurement circuit that functions as the time counter is provided one for the two or more time measurement circuits that function as the difference counter.

7. The imaging sensor according to claim 6, wherein
the time measurement circuit that functions as the time counter is provided in the vicinity of the two or more time measurement circuits that function as the difference counter.

8. The imaging sensor according to claim 1, wherein
the plurality of pixels and the plurality of signal processing circuits are arranged in the form of a two-dimensional array and
the time measurement circuit that functions as the time counter is provided one for each row or for each column.

9. The imaging sensor according to claim 1, wherein
the time measurement circuit that functions as the time counter is provided one or more within the imaging sensor.

10. The imaging sensor according to claim 1, wherein
at least one of the time measurement circuits configuring the plurality of time measurement circuits can be switched between functioning as the time counter and functioning as the difference sensor.

11. The imaging sensor according to claim 1, wherein
at a position corresponding to a pixel located at an end portion of each pixel constituting a cutout-target image area, the time measurement circuit as the time counter is arranged.

12. A control method of an imaging sensor comprising a plurality of pixels including an avalanche photodiode that detects incidence of a photon and a plurality of signal processing circuits having a pulse generation circuit configured to generate a pulse based on photon detection in the avalanche photodiode and a pixel counter that counts pulses output from the pulse generation circuit, the control method comprising:
   a first obtaining step of obtaining a time from the pixel counter starting count of the pulses until saturation by at least one of a plurality of time measurement circuits configured to measure a time until the pixel counter saturates;
   a second obtaining step of obtaining a difference between a time until a certain pixel counter saturates and a time until another pixel counter different from the certain pixel counter saturates by the other time measurement circuits;
   a derivation step of deriving a time from the other pixel counter for which the difference has been obtained at the second obtaining step starting count of the pulses until saturation; and
   a storage step of storing a time value indicating the derived time for next derivation, wherein
   at the derivation step, the time from the other pixel counter starting count of the pulses until saturation is derived by adding the difference obtained at the second obtaining step to the time value stored at the storage step or subtracting the difference from the time value.

* * * * *